Figure 5:
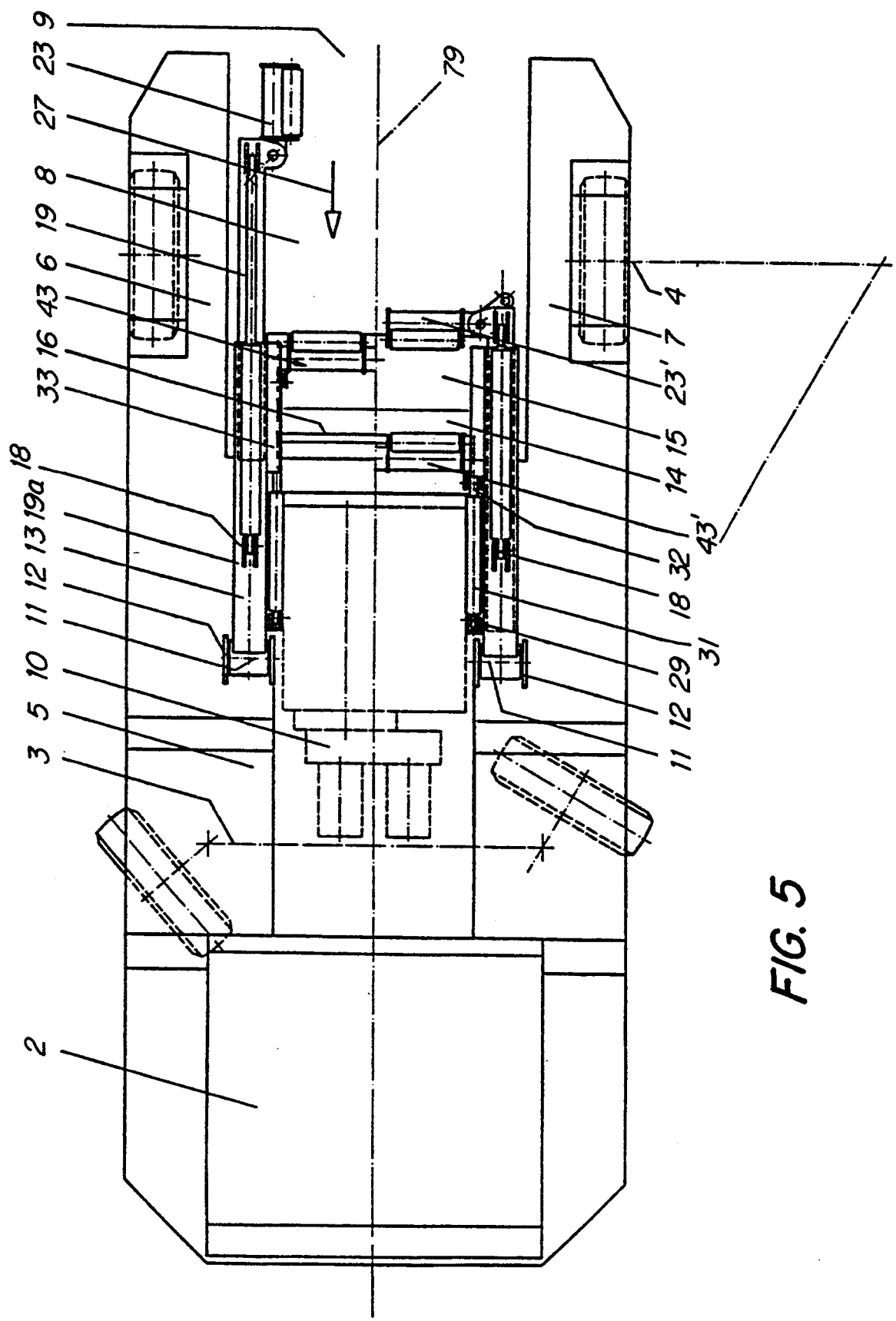

United States Patent [19]

Cürten et al.

[11] Patent Number: 5,336,037
[45] Date of Patent: Aug. 9, 1994

[54] TOW VEHICLE FOR MANUEVERING OF VEHICLES

[75] Inventors: Franz J. Cürten; Michael Bammel, both of Ulm, Fed. Rep. of Germany

[73] Assignee: Goldhofer Fahrzeugwerk GmbH & Co., Fed. Rep. of Germany

[21] Appl. No.: 6,369

[22] Filed: Jan. 19, 1993

Related U.S. Application Data

[63] Continuation of Ser. No. 391,549, filed as PCT/EP88/00044, Jan. 22, 1988, abandoned.

[30] Foreign Application Priority Data

Jan. 23, 1987 [DE] Fed. Rep. of Germany ....... 3701971
Feb. 20, 1987 [DE] Fed. Rep. of Germany ....... 3705402

[51] Int. Cl.$^5$ ............................................... B60P 3/11
[52] U.S. Cl. ........................... 414/429; 244/50; 180/904
[58] Field of Search ............... 244/50; 414/426–429; 410/30; 180/14.7, 904

[56] References Cited

U.S. PATENT DOCUMENTS

| | | | |
|---|---|---|---|
| 4,225,279 | 9/1980 | Boyer | 414/428 |
| 4,632,625 | 12/1986 | Schuller et al. | 414/429 |
| 4,658,924 | 4/1987 | Dobbie | 180/14.1 |
| 4,810,157 | 3/1989 | Schopf | 414/429 |
| 4,911,603 | 3/1990 | Pollner et al. | 414/428 |
| 4,917,564 | 4/1990 | Pollner et al. | 414/428 |
| 4,997,331 | 3/1991 | Grinsted et al. | 244/50 X |

FOREIGN PATENT DOCUMENTS

| | | |
|---|---|---|
| 126386 | 5/1984 | European Pat. Off. . |
| 206528 | 5/1986 | European Pat. Off. . |
| 9014266 | 11/1990 | European Pat. Off. ............. 244/50 |
| 952767 | 5/1956 | Fed. Rep. of Germany . |
| 3318077 | 11/1984 | Fed. Rep. of Germany . |
| 3327629 | 2/1985 | Fed. Rep. of Germany . |
| 3534045 | 9/1985 | Fed. Rep. of Germany . |
| 361807 | 11/1987 | Fed. Rep. of Germany . |
| 3732645 | 9/1988 | Fed. Rep. of Germany . |
| 2452427 | 10/1980 | France . |
| 245409 | 11/1980 | France . |
| 562237 | 6/1979 | Japan . |
| 1334800 | 10/1973 | United Kingdom . |
| 2175550 | 12/1986 | United Kingdom . |

*Primary Examiner*—Karin L. Tyson
*Assistant Examiner*—Carla Mattix

[57] ABSTRACT

A towing vehicle for maneuvering airplanes without draw tongue, has a chassis (5), which exhibits a fork-shaped receiver space between the wheels of one wheel axle, in which a gripping and retracting device (28, 68) is attached that can be retracted and extended and works together with a lifting device, by means of which the nose wheel (24) of the airplane can be grasped and pulled onto a scoop (14) that can be raised and lowered relative to the chassis. In it, only a single scoop (14) is present to support the nose wheel (24) in the area of the nose wheel load line of application to prevent clamping and deformation forces on the nose wheel (24) during the retraction procedure or during raising. The scoop can be tipped around a horizontal axle attached to the chassis and its tipped position relative to the chassis can be adjusted by control. In a further development, the scoop can also be tilted at an angle to the horizontal axle, so that while the towing vehicle is driving around curves with a loaded nose wheel, no non-permissible stresses occur. Preferably, the attachment of the scoop to the chassis is done using a parallelogram (70, 71, 73, 74) or a trapezoid structure.

54 Claims, 14 Drawing Sheets

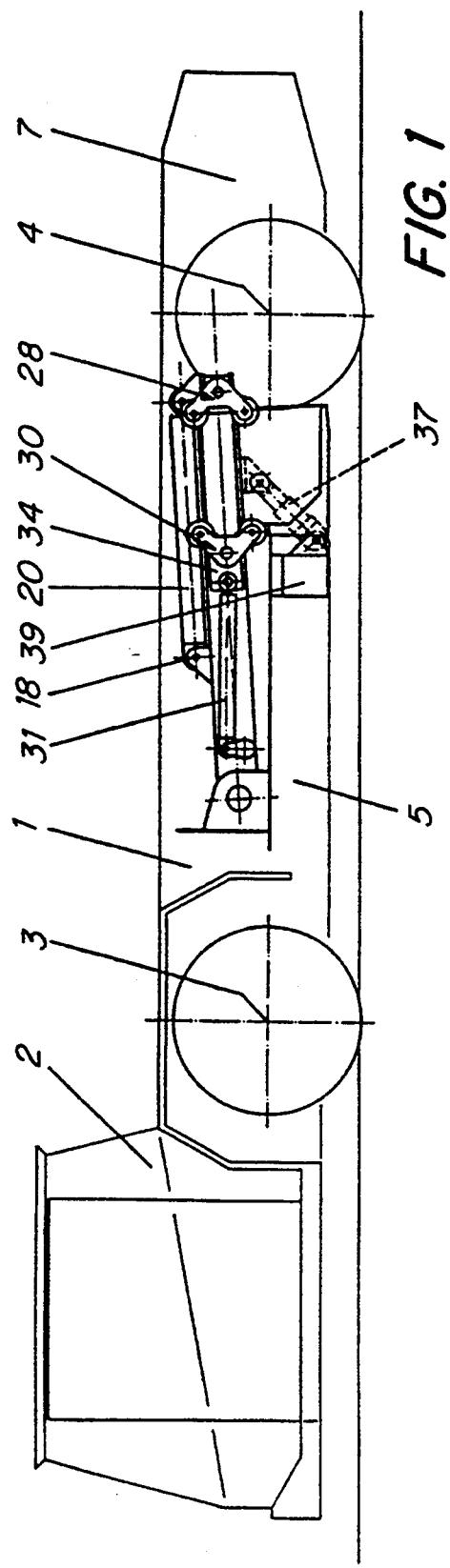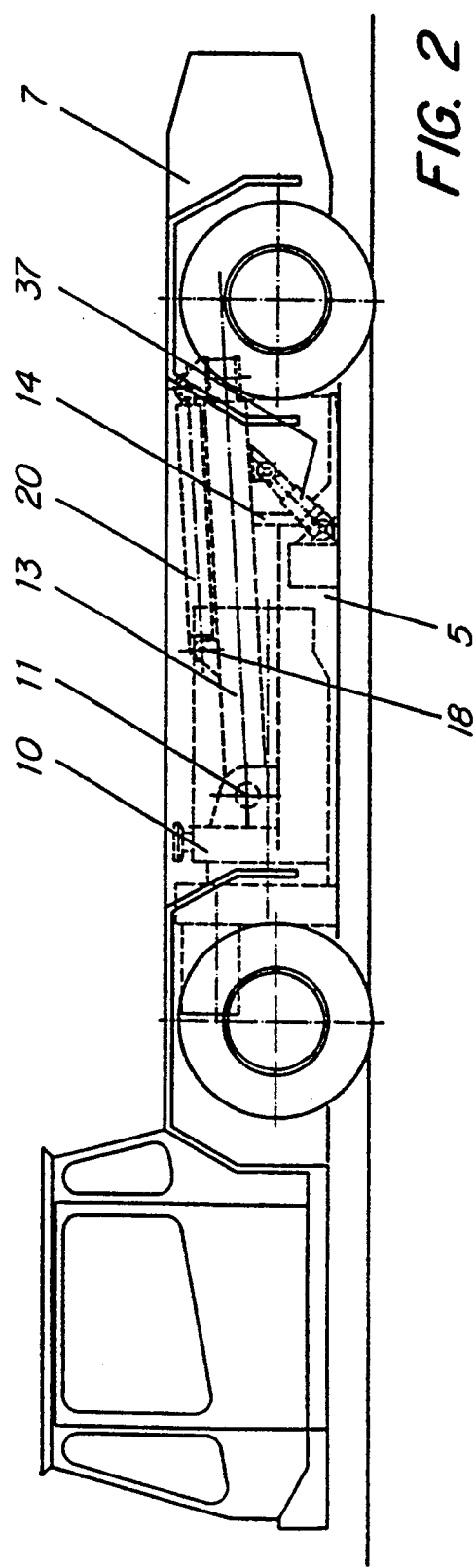

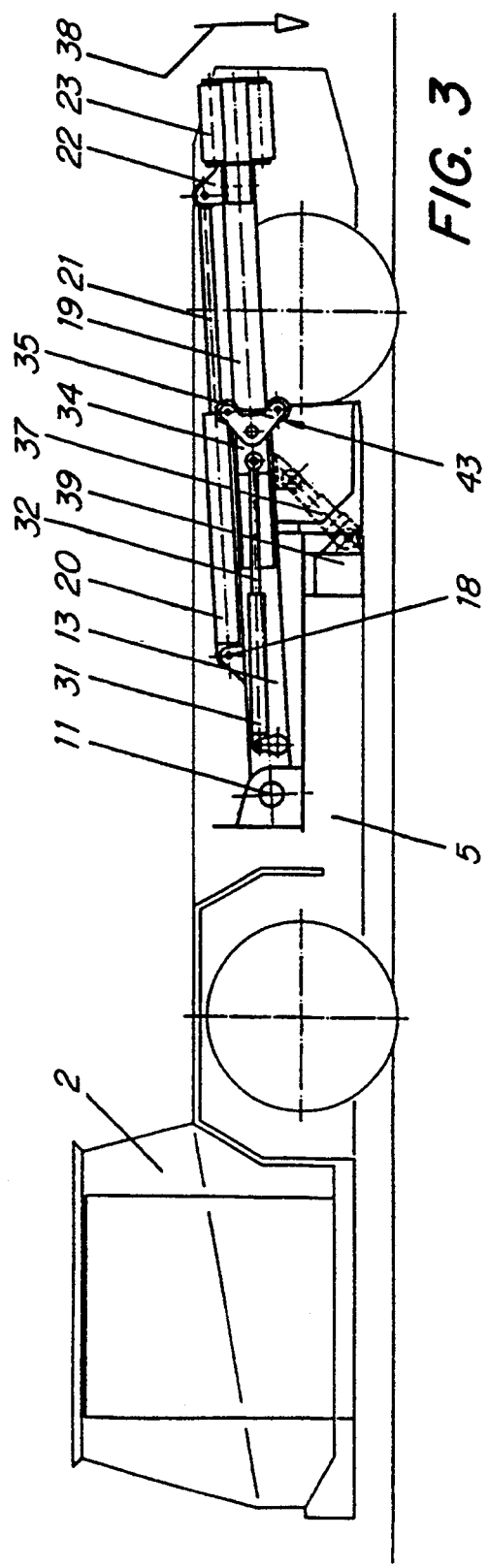
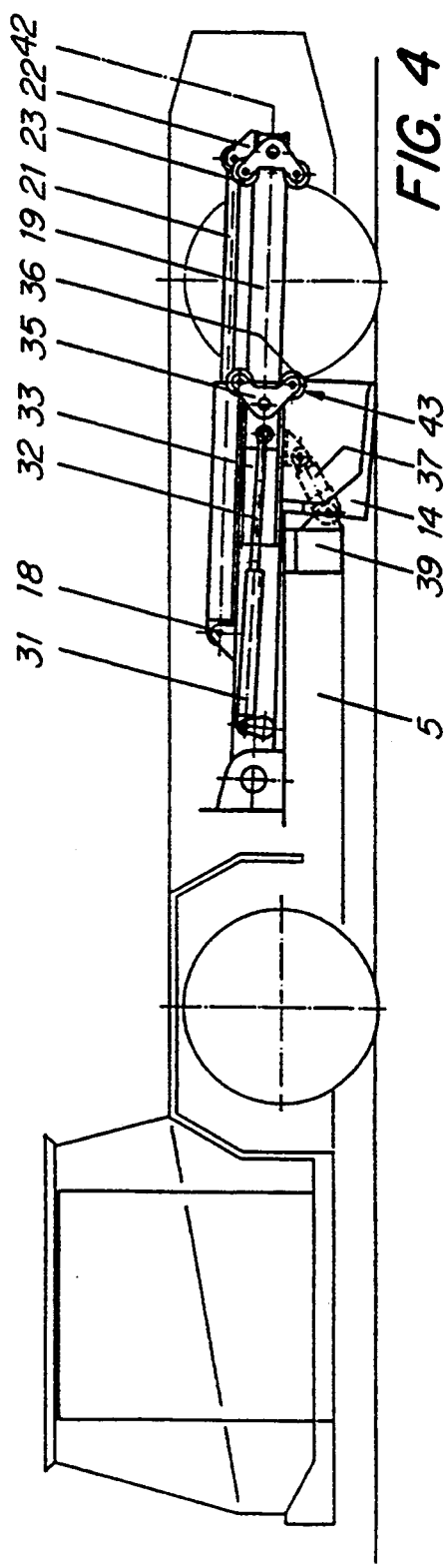

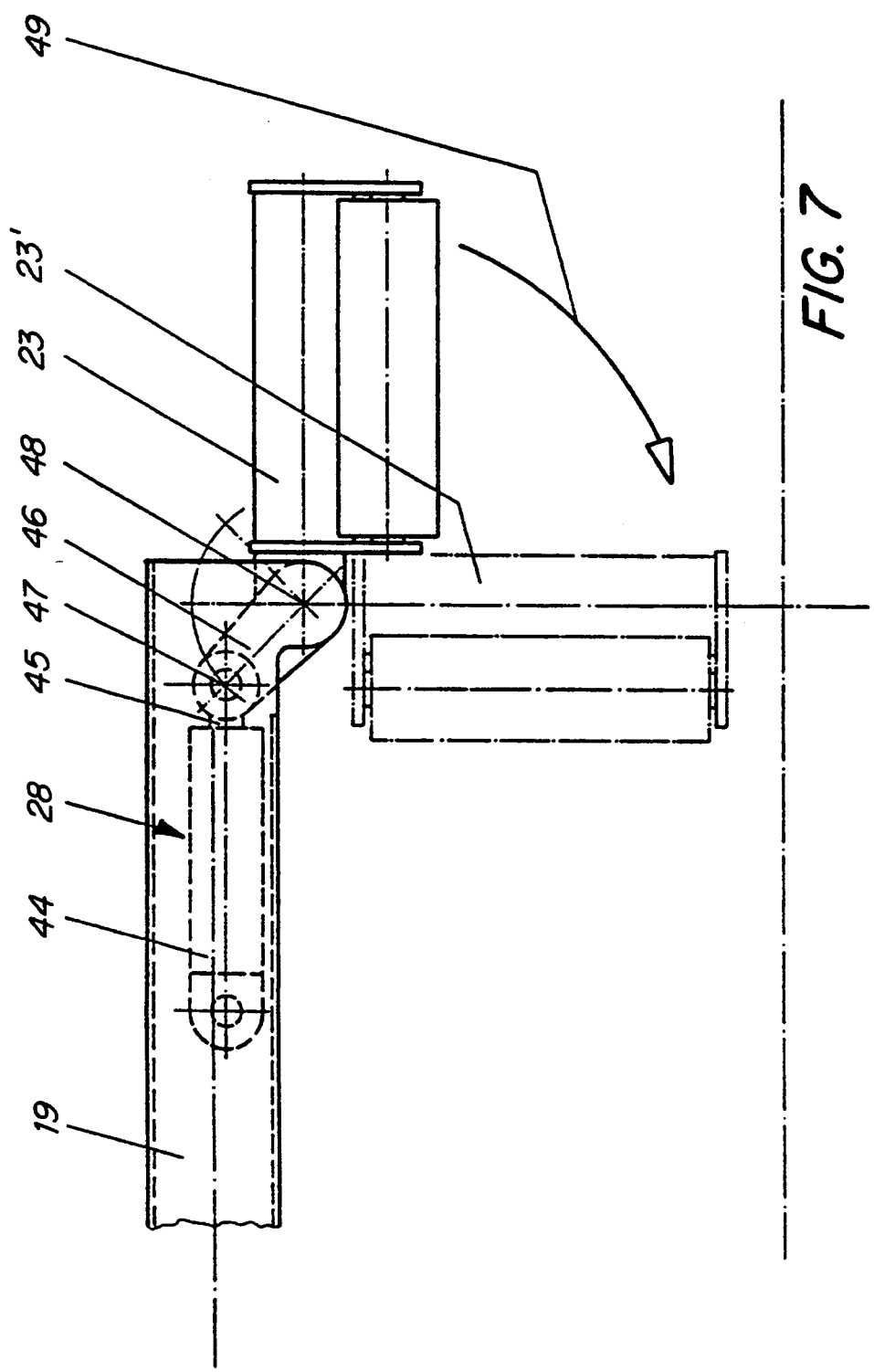

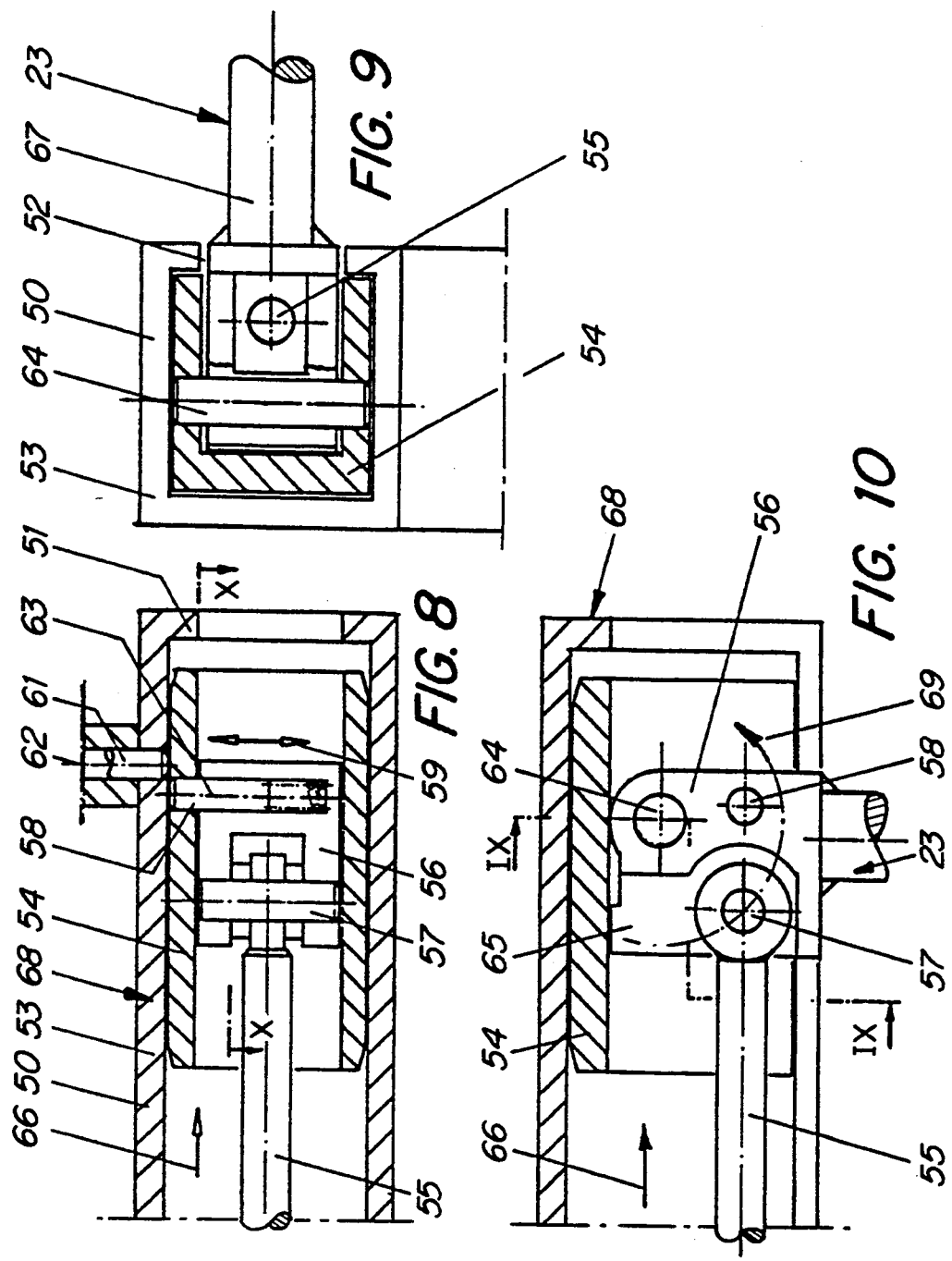

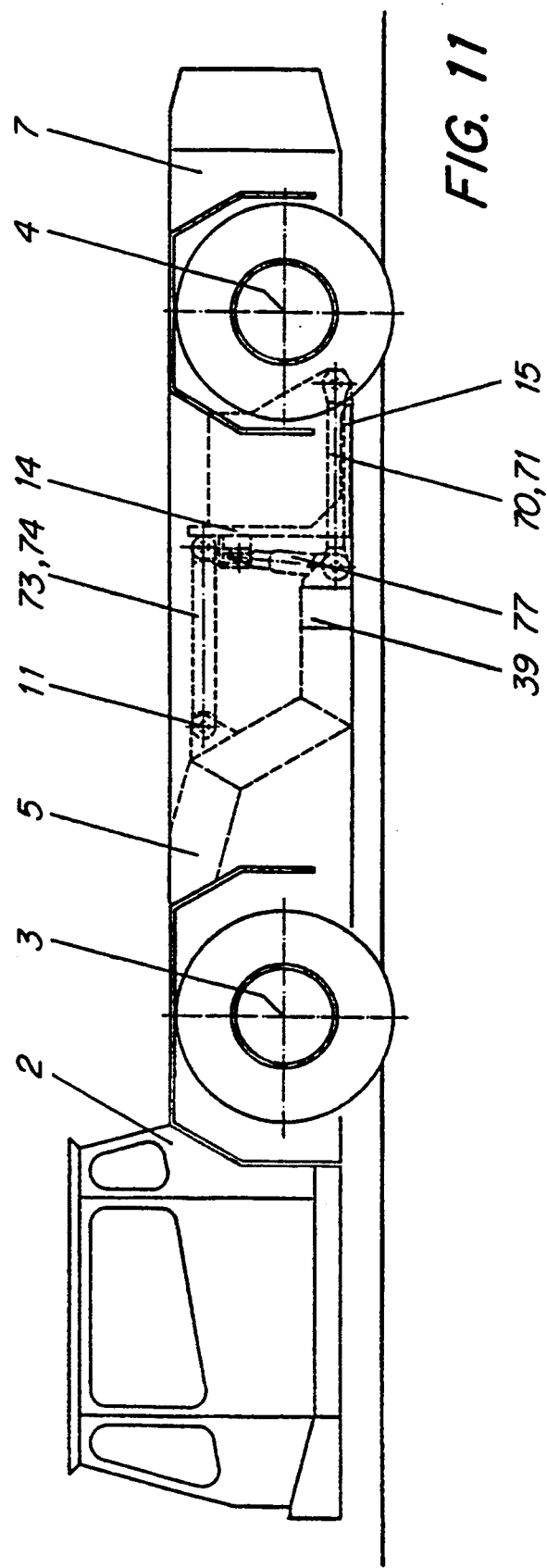

TOW VEHICLE FOR MANUEVERING OF VEHICLES

This is a continuation of copending application(s) Ser. No. 07/391,549 filed as PCT/EP88/00044, Jan. 22, 1988, now abandoned.

DESCRIPTION

The invention concerns a towing vehicle for maneuvering airplanes without a draw tongue, the chassis of which has a fork-shaped receiver space between the wheels of one wheel axle, in which an extendable and retractable gripping and retracting device that works together with a lifting mechanism is installed, by means of which the nose wheel of the plane can be grasped and can be pulled onto a scoop that can be raised and lowered relative to the chassis.

A towing vehicle of this construction type is known (DE-PS 33 18 077), which has three lifting scoops, each relatively narrow, that are mounted in tipping joints so that they can swing. One of the scoops is assigned to the front side of the nose wheel to be grasped, on the vehicle side end of the receiver space. The other two tipping scoops, however, are against the open end of the receiver space and thereby are assigned to the rear side of the nose wheel, and namely in the area of the base. In addition, the gripping device can be moved out of the fork-shaped receiver space toward the rear. Finally, additional clamping devices are present which are used on the nose wheel in the upper area of its periphery.

In this, it can be considered disadvantageous that the nose wheel is grasped and compressed and thus deformed at points along its periphery that do not correspond to its normal, usual position on the ground, so that undesirable stresses on the nose wheel can be caused. In addition, it is a disadvantage that during retraction of the nose wheel into the receiver space, the known gripper device first is driven considerably out of the receiver space, thereby extending beyond the limit of the rear side opening of the receiver space, which leads to increased technical effort for managing the gripper device mechanically and/or in terms of strength because of the considerable length of the lever arms that this entails.

The invention is based on the task of creating a towing vehicle of the construction type mentioned at the beginning, which has a simpler structure that is mechanically easier to manage with fewer components and largely prevents pinching the nose wheel and/or additional stress on it.

This task was solved by the invention in that a single scoop is present for support of the nose wheel in the area of the nose wheel load line of application and that the gripper device is limited in its extendibility to the length of the receiver space. Because of this, in the known towing vehicle, there is absolutely no support present in the area of the nose wheel load line of application, i.e. in that peripheral area of the nose wheel that normally rests on the ground. Much more so, there are forces that are exerted upwards diagonally to the center of the nose wheel by three lifting scoops that are designed as sort of clamping wedges, of which only the resultant of the line of application of nose wheel load is opposed, which in the end means a clamping stress on the nose wheel. In the object of the invention, the nose wheel rests on the single scoop practically completely in the same way as it would otherwise normally rest on the ground. Limiting the extendibility of the gripper device to the length of the receiver space results in observable, mechanically limited stresses which can be managed without great technical effort.

In particular, when the gripping point of the gripping and retracting device is preferably permitted to touch the nose wheel on the periphery above the axis of rotation, additional clamping devices are expendable, which additionally simplifies the structure. In addition, the advantage attained is that the gripping and retracting device is installed far from the ground and not, as in the pictured, known towing vehicle, near the receiver surfaces of the narrow tipping scoops there and thereby in the area of the ground, which can lead to touching the ground and possible damage.

In the object of an older suggestion (DE-OS 36 16 807), a single scoop was in fact already used, but had to be made (using a relatively expensive design) into a front and a rear part that could be raised and lowered in the area of a horizontal bending axis, in order to permit the required movement of the scoop towards the ground for acceptance of the nose wheel and again away from the ground. In addition, the gripping and retracting device also moved over the rear limit of the vehicle and thereby of the receiver space in order to swing behind the nose wheel to be retracted, which leads to the disadvantages named for the object of the construction type mentioned in the beginning.

Almost all airplane chassis and/or nose wheels have shock-absorbing struts, which create the connection from the wheel train to the front of the airplane. The longitudinal axis of the respective shock-absorbing strut almost always makes an angle to the vertical. This angle is required in order to lend a certain positive caster to the wheel train and/or nose wheel. Turning the nose wheel around the longitudinal axis of the shock-absorbing strut, for example during steering of the airplane on the ground, necessarily leads to an inclination of the airplane nose wheel with respect to the horizontal and/or ground plane, i.e. to a sharp angle between these two planes, as is also customary, for example, during the steering movement of the front wheel in two-wheelers. In this, it is clear that a rotation of the nose wheel around the longitudinal axis of the shock-absorbing strut must also occur during the time that the vehicle convoy consisting of towing vehicle and airplane drives around curves, which leads to the above mentioned sloping position of the nose wheel on the scoop. Here as well, undesirable clamping and bending forces between towing vehicle and nose wheel can not be prevented with the known towing vehicles. It is seen as a task of the invention to prevent this type of disadvantage in a further development.

This is achieved in that the scoop is also continuously adjustable around a fictitious longitudinal axis to a position at an angle to the horizontal axis, whereby, according to a preferred execution type, the scoop is attached to the chassis so that it can be raised, lowered and tipped to an angled position via lower and upper control arms and is operated via a fluid cylinder, whereby the upper and lower control arms create a parallelogram structure that is connected on one side to the chassis and on the other side to the scoop. Preferably the application lines of the upper control arms intersect at a point on the imaginary longitudinal axis that creates a pendulum point of the scoop.

In addition, the lower control arms can be installed almost parallel to the vehicle longitudinal axis and touch each side of the scoop with their scoop-side attaching points. In this, the attachment can be made in such a way that the scoop can automatically be adapted to an inclination of the nose wheel.

With the presence of only a single fluid cylinder to raise and lower the scoop, it is necessary to place the application line of this fluid cylinder and/or of this fluid cylinder/piston unit in the vertical longitudinal center plane of the scoop, whereby this vertical longitudinal center plane contains the vehicle longitudinal axis.

In contrast, if two fluid cylinder/piston units are used for raising and lowering the scoop, the lines of application of this unit are necessarily placed mirror-symmetrically to the longitudinal center plane. In this case, both the units are interconnected with regard to their fluid, in order to permit automatic adjustment of the angle position of the scoop under the influence of the nose wheel motion during curves. The interconnection can be constructed so that it can be closed off. Basically the gripping and retracting device and an ejecting device that is used to push the nose wheel from the scoop at the end of the maneuvering process are connected rigidly to the scoop axle. The attachment, i.e. the retractable and extendable gripping and retracting device with the ejecting device on the one hand and the scoop on the other hand is basically structured in an H shape in the top view. This configuration is especially advantageous in execution examples in which the raising and lowering of the scoop is simply done by tipping it around a horizontal axle, whereby according to the invention the horizontal axle is installed on the chassis and the tipping position of the scoop is controlled so that it can be adjusted relative to the chassis. In these cases, at least one fluid cylinder/piston unit is present as a lifting device for controlled adjustment of the scoop tipping position. In this case, a swinging arm can be used, with one end attached to pivot on the horizontal axle, that can basically be pushed vertically, to which the scoop is rigidly attached and which can be raised, lowered or swung with it. If two telescoping supports are used as gripping and retracting devices, the swinging arm can be constructed from the two basic elements of the telescoping supports, the vehicle side ends of which can be swung around the horizontal axle. The H shape is formed on the one hand by the two basic elements of the telescoping supports that are parallel to each other, which can be swung around the horizontal axle at one end and are attached firmly to the scoop at the other end; and on the other hand by the scoop itself, which represents the cross bar of the H, and the extendable elements of the support, which represent the two bars of the H that are on the nose wheel side and have swinging gripper arms at their ends, which can grip the nose wheel.

In this, the ejecting device necessarily consists of fluid cylinder/piston units parallel to the supports. They are preferably installed on the supports themselves, one end is attached to the support or swinging arm so that it can pivot. The other end exhibits a slider that can be pushed axially in a guide rail that is mounted parallel to the axis on the support or arm and on which the ejector arm is mounted.

Reference has been made already to the possible use of the supports and/or the basic elements of the supports as a swinging arm and/or arms for raising, lowering and turning the scoop. Raising and lowering the scoop using a parallelogram structure that is attached on one side to the vehicle and on the other side to the scoop was already explained. Finally, the possibility of attaching the scoop to the chassis so that it can be raised and lowered by means of a sliding carrier also needs to be mentioned.

In another execution example of the invention with the use of a swinging arm that can be basically be swung vertically, to which the scoop is firmly attached and with which same can be raised, lowered and swung, whereby swinging gripper arms are present on the free ends of the gripping and retracting device, which exhibits two supports that hold the nose wheel between them; the swinging arm necessarily consists of the two supports, which are designed in pipe shapes and the vehicle-side ends of which can be swung around the horizontal axle. The two supports each exhibit guide slots that run in the lengthwise direction inward towards the nose wheel. In each of the supports, there is an axially movable shoe, which contains a lever head that can be moved eccentrically around a vertical axle opposed to the line of action of a cylinder/piston unit whereby on the swinging end of the lever head, the respective gripper arm is attached.

The turning of the lever head in the shoe can be locked on the one hand, while on the other hand, in the extended end position of the shoe in the pipe-shaped support, this locking between shoe and lever head can be removed and simultaneously the shoe can be locked in the support by a pushing bolt that can be moved in the lever head axle direction and perpendicularly to the shoe.

It should also be mentioned that in use of a swinging arm for connection between the scoop on the one hand and the chassis on the other, the advantage attained was that, corresponding to the length of the swinging arm, the scoop does not swing in a narrow swinging circle in the vertical plane, as is the case in the previous state of technology, Rather, the swinging circle can have a relatively large radius, which adds to the protection of the nose wheel during operation of the device.

The following function is common to all of the execution examples:

Before the nose wheel is approached, the ejecting device and the gripping and retracting device are driven out completely to the rear and the gripper arms of the gripping and retracting device, which are necessarily equipped with support rollers, are swung either back or downward, in order to release the entrance opening of the receiver space for the nose wheel. The scoop is in drive position, i.e. it is raised.

The towing vehicle now drives backward far enough so that the nose wheel is against the ejector arms of the ejecting device, which necessarily also have support rollers. Then the scoop is lowered by retracting the lifting cylinders and/or the lifting cylinder, the gripper arms with their support rollers are swung behind the nose wheel, and the parking brake of the vehicle is applied.

After retraction of the ejecting device, the nose wheel is pulled onto the scoop by retraction of the gripping and retracting device so far that it comes in contact with the support rollers of the ejector arms of the ejecting device. The scoop with the nose wheel is then raised by appropriate control of the lifting cylinder and, if necessary, locked on the chassis frame.

It must be emphasized that the ability of the scoop to tilt while driving around curves is not Just possible through the described attachment of control arms, but that corresponding bearing points can be created on a sliding carrier that carries the scoop and that can be raised and lowered in such a way that tilting the scoop is possible. This is naturally also true with use of swinging arms. The described, preferred rigid axle attachment of the scoop with respect to the swinging arms and/or supports in the H attachment described understandably only relates to perpendicular and/or horizontal axes; the possibility of the scoop to tilt by turning around a longitudinal axis, that is around an axis so that it can be attached parallel to the vehicle longitudinal axis or even parallel to the central plane of the swinging arms, remains unaffected by that. In other words: the scoop can move to the side on its suspension, but does not turn around a horizontal axis independently of its suspension; such turning is much more caused by the motion of the suspension itself and in this way depends on a motion of the swinging arms, supports, attachment points of the control arms and the like.

Additional advantageous developments result from the subclaims.

In the following, the invention is to be explained in more detail using the execution examples represented in the drawing.

Figure 6:
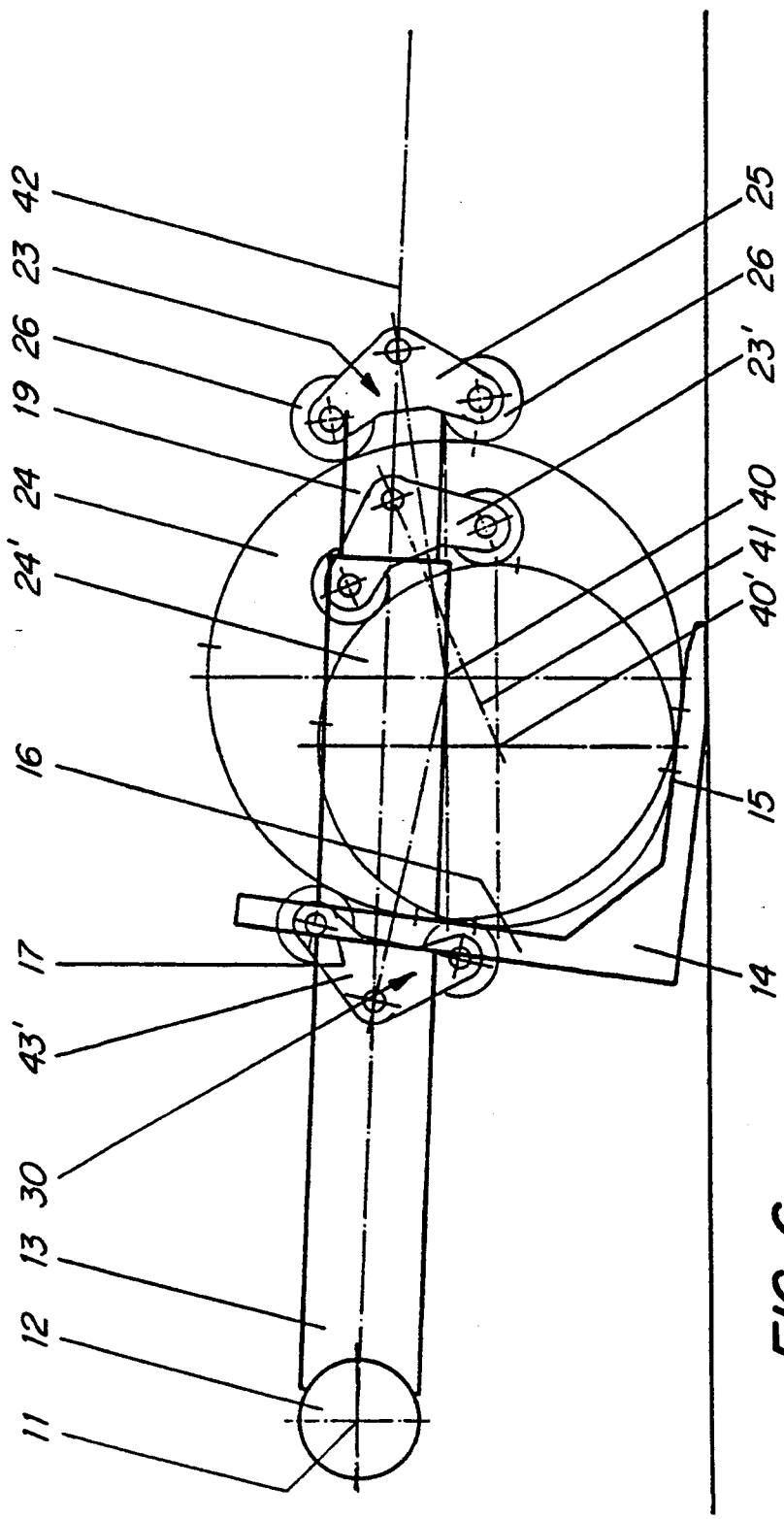
Figure 12:
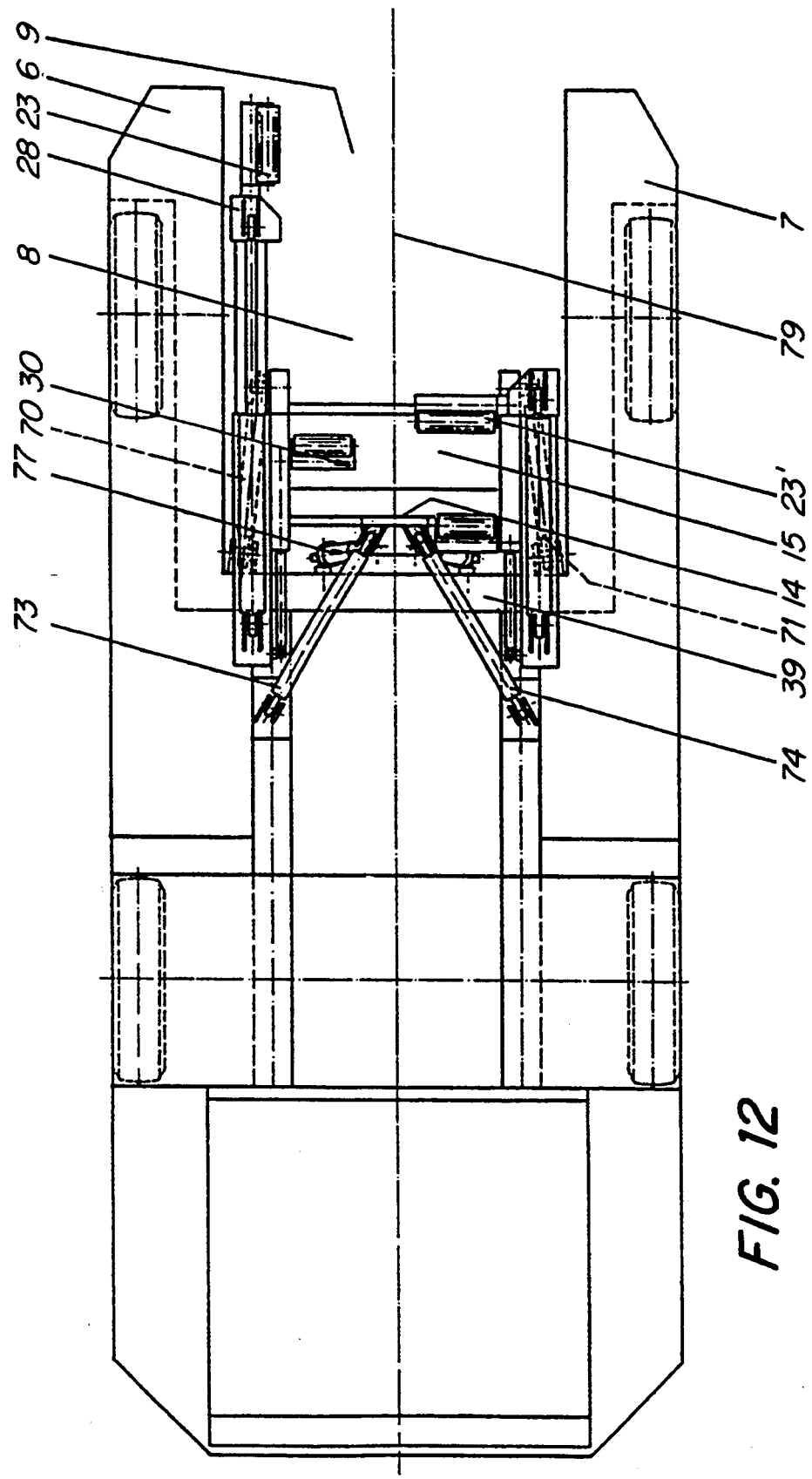
Figure 13:
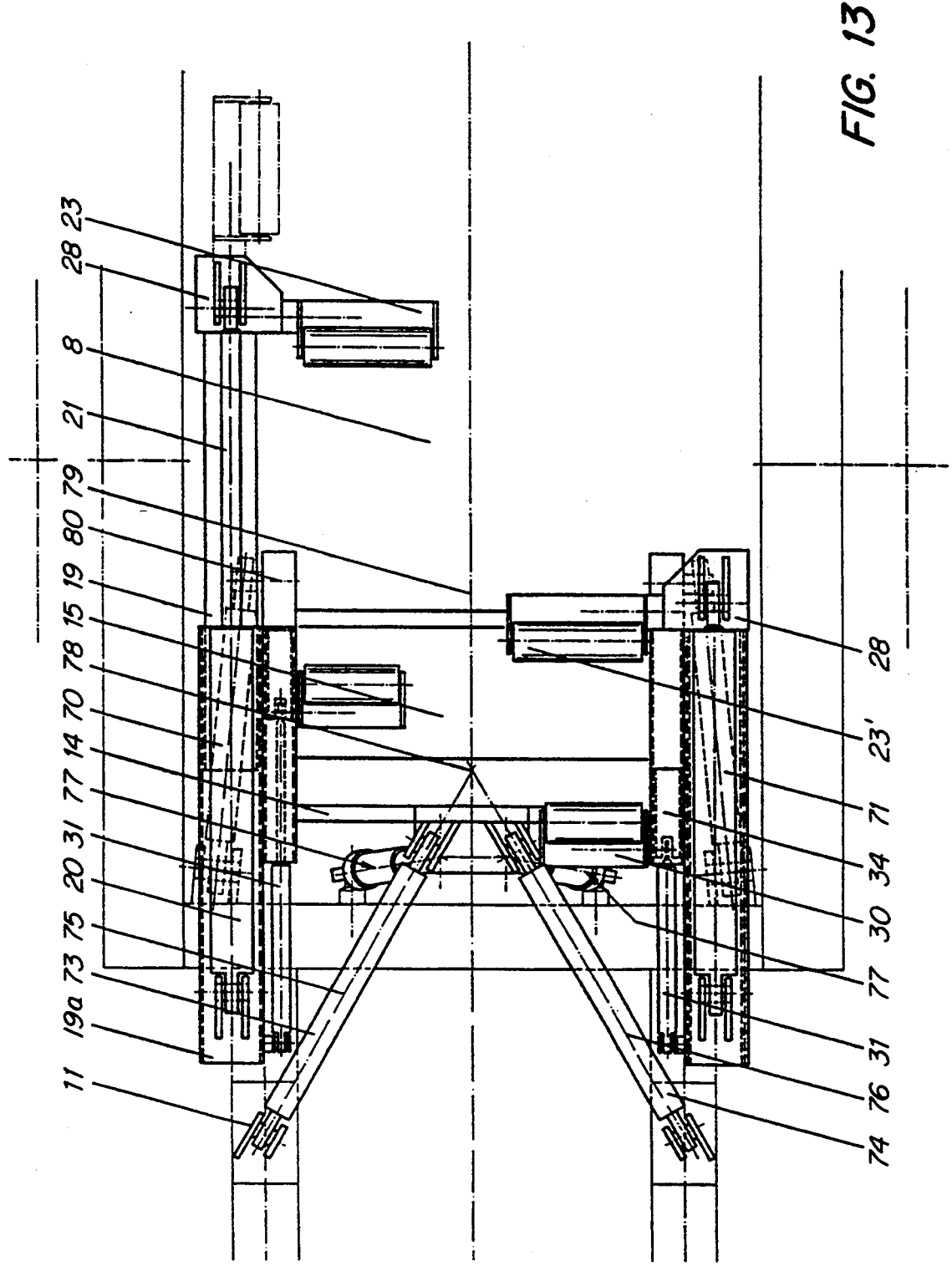
Figure 14:
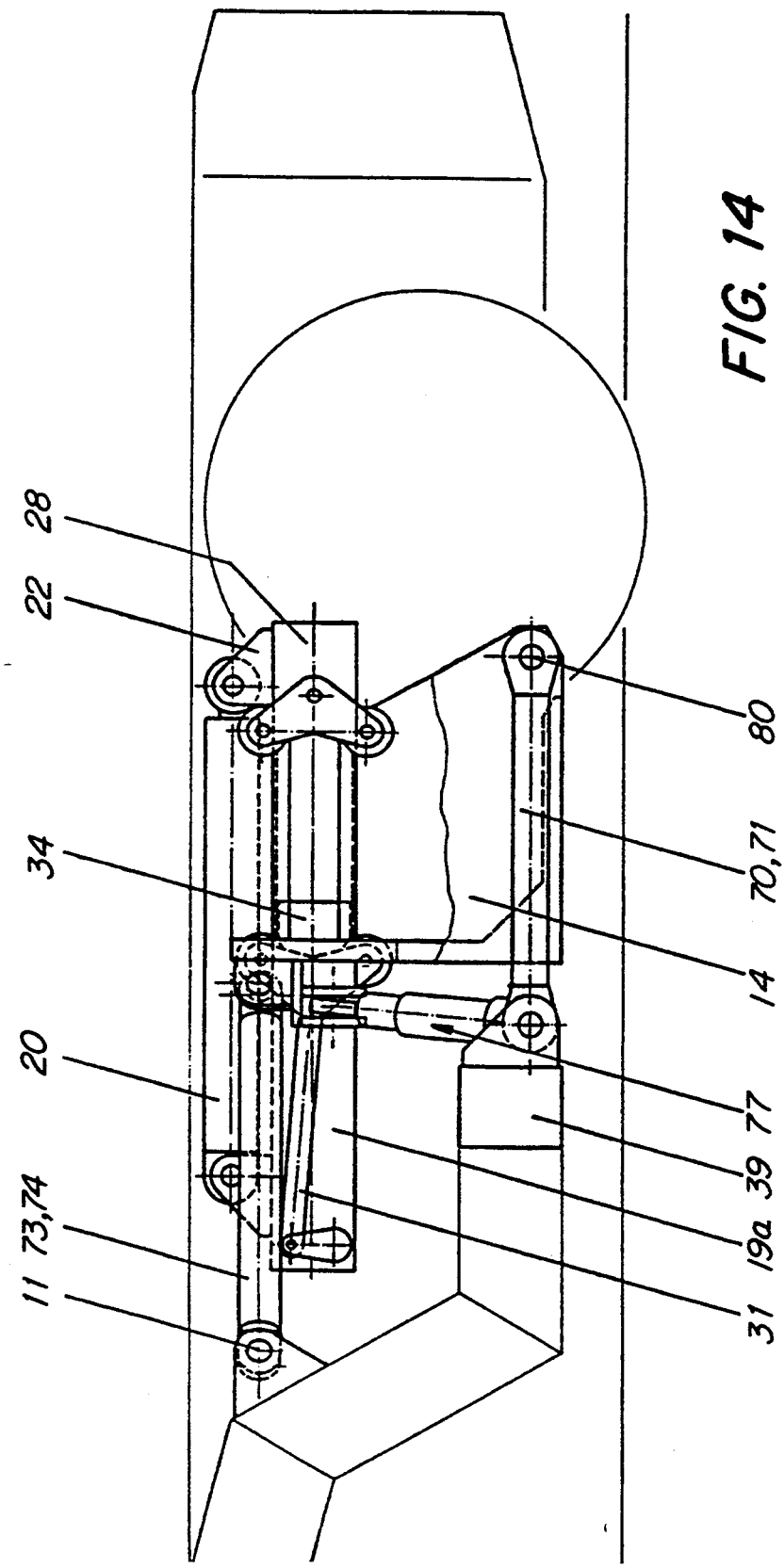
Figure 15:
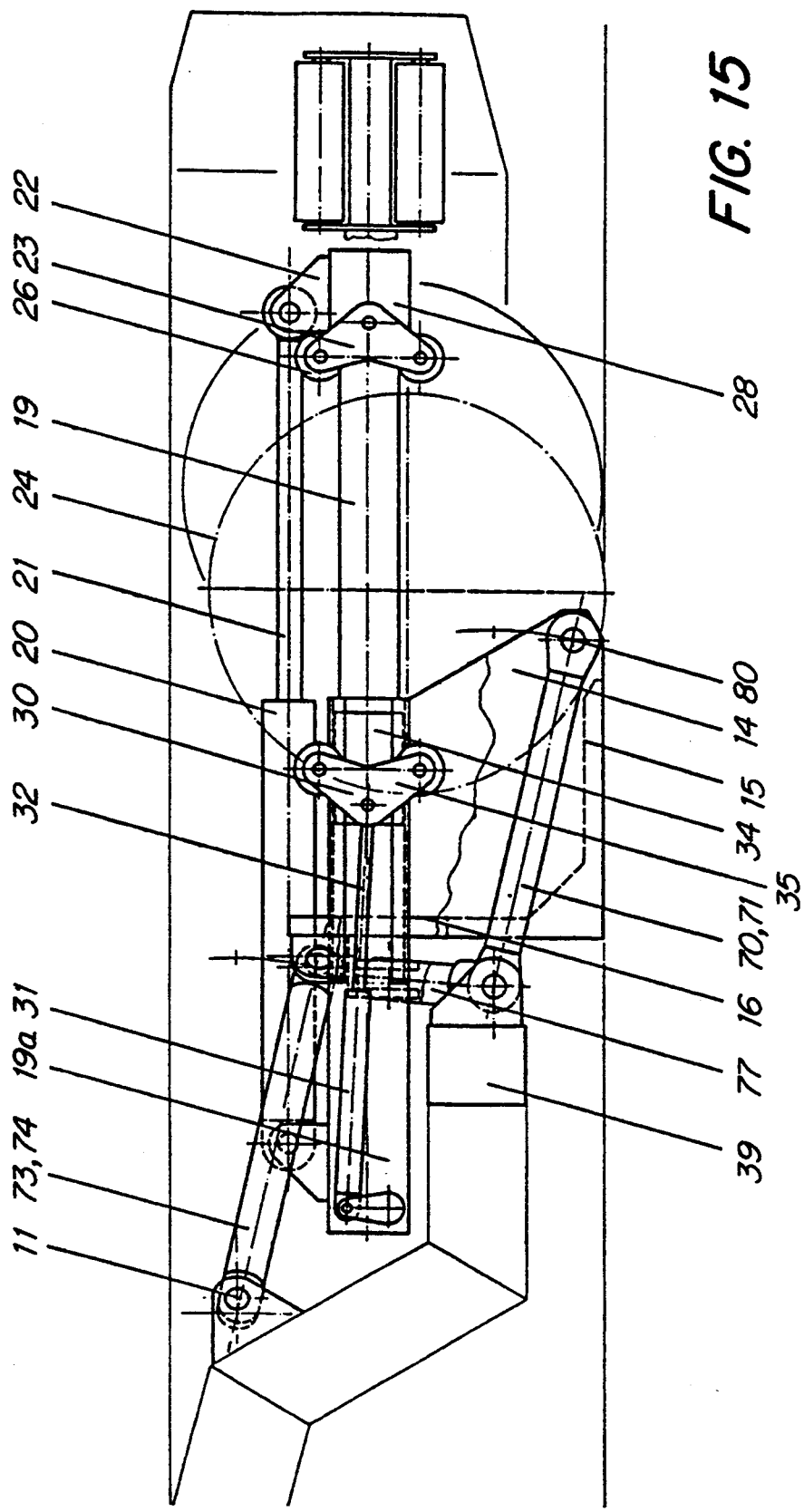
Figure 16:
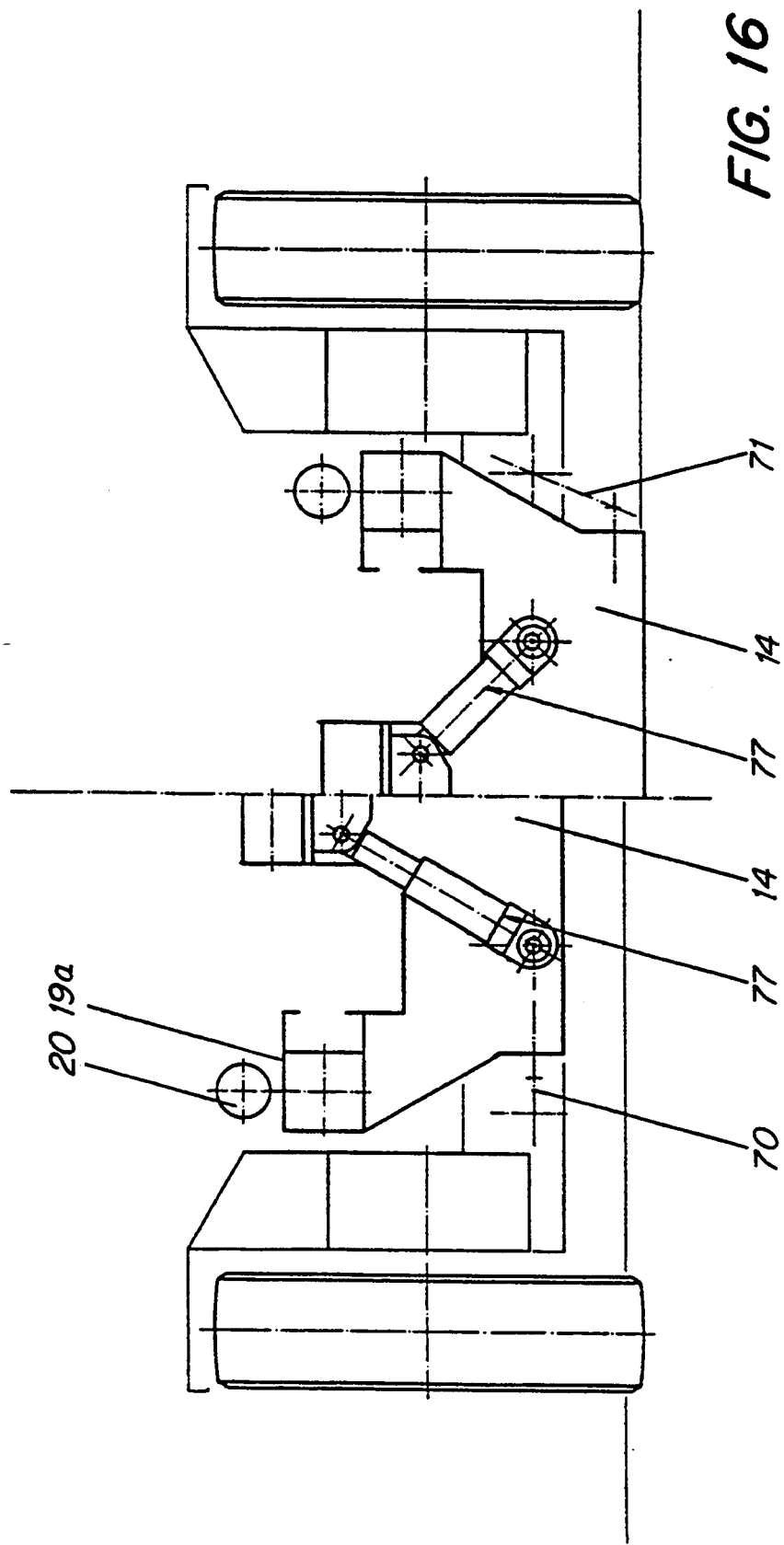
Figure 17:
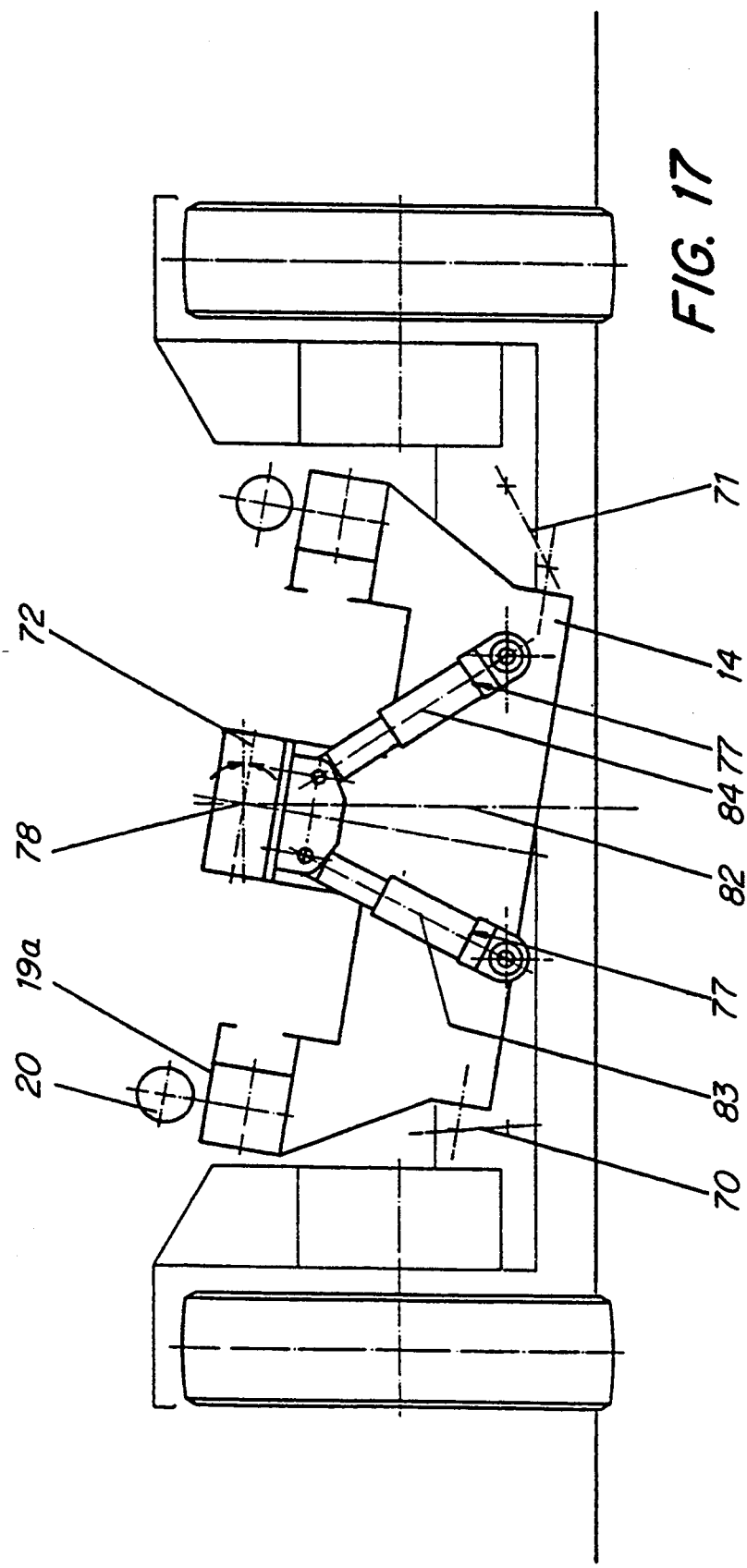
Figure 18:
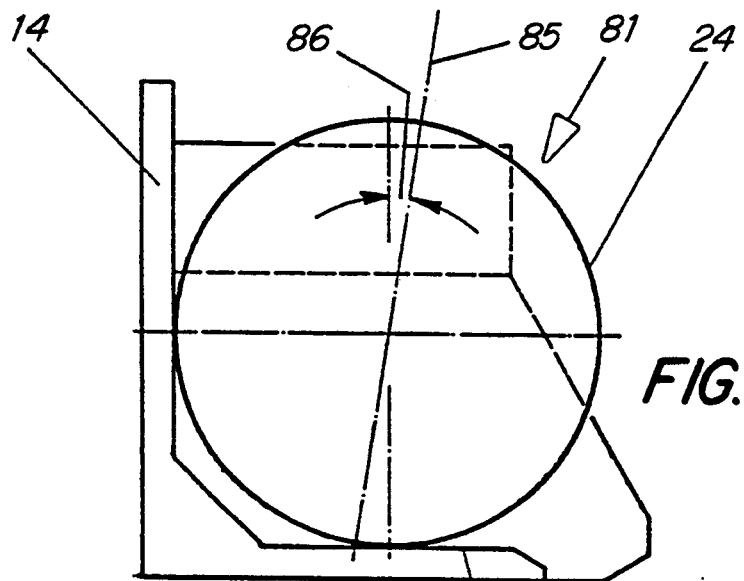
Figure 19:
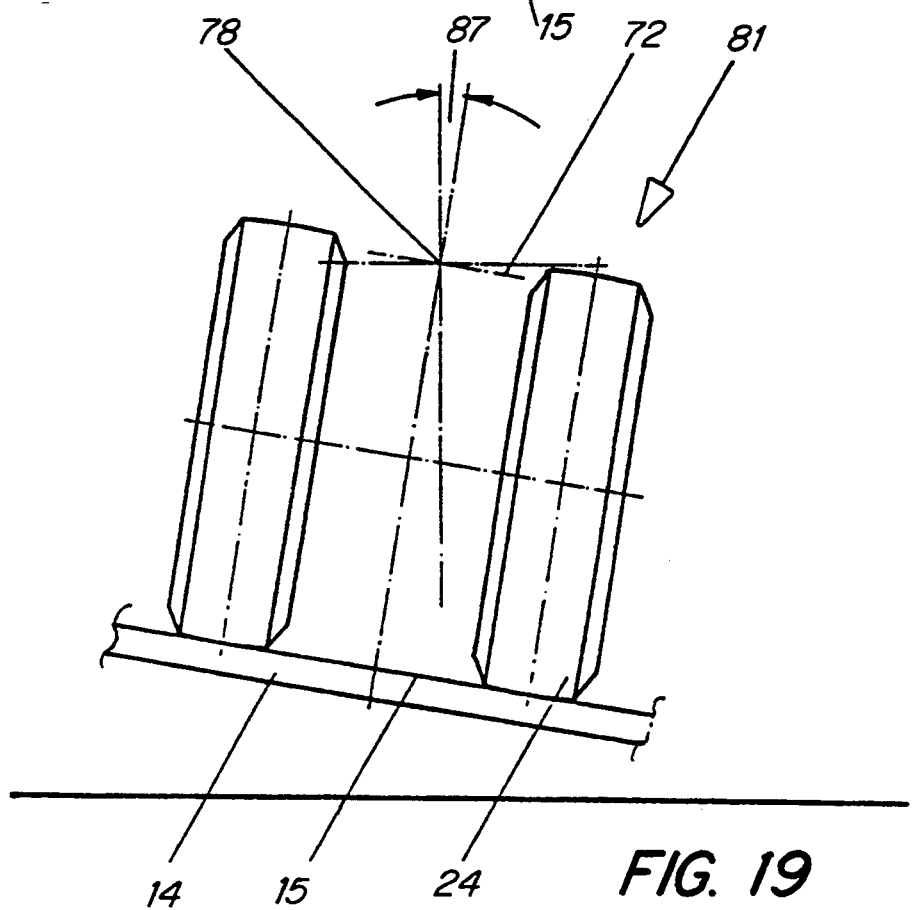

Shown in:

FIG. 1 side view of a first execution example of the towing vehicle with raised scoop;

FIG. 2 further details of the execution example according to FIG. 1;

FIG. 3 the towing vehicle according to FIG. 1 with the gripping and retracting device extended;

FIG. 4 the towing vehicle according to FIG. 3 with the gripper arms swung in;

FIG. 5 a top view of the towing vehicle according to FIG. 3 with gripper arms swung out (upper half) and gripper arms swung in (lower half);

FIG. 6 schematized and enlarged side view of the scoop with representation showing principles of the gripping and retracting device with adaptation to two different nose wheel diameters;

FIG. 7 top view of the swinging mechanism of a gripper arm;

FIG. 8 a partial section, schematized, through another execution example of a gripping and retracting device;

FIG. 9 a cross section of the device according to FIG. 8 along the line IX—IX in FIG. 10;

FIG. 10 a cross section along line X—X in FIG. 8;

FIG. 11 another execution example of the towing vehicle tn side view, schematized, with a scoop that can be raised and lowered as well as tilted in raised position;

FIG. 12 a top view of the execution example according to FIG. 11;

FIG. 13 details of the execution example according to FIG. 12 in enlarged representation;

FIG. 14 a side view of the representation according to FIG. 13 with scoop in raised state with retracted gripping and retracting and ejecting devices;

FIG. 15 same representation as in FIG. 14 with scoop in lowered position with retracted gripping and retracting and ejecting devices;

FIG. 16 a face view of the scoop from the vehicle side, left in raised position and right in lowered position;

FIG. 17 a face view according to FIG. 16 on the left with tilted scoop;

FIG. 18 a side view, schematized, of the scoop with nose wheel lying on it;

FIG. 19 face view of the nose wheel according to FIG. 18 while the towing vehicle is driving around a curve.

The towing vehicle 1 shown in FIGS. 1–5 has a driver cab 2, which is installed at the front end of a U-shaped chassis 5, which in the execution example shown exhibits a front axle 3 and a rear axle 4. The front axle 3 is constructed as a steering axle, rear axle 4 is rigid. If necessary, rear axle 4 can also be made a steering axle in addition to front axle 3. Instead of the two axles 3, 4 shown, multiple-axle vehicles are also possible.

According to FIG. 5, the U-shaped chassis 5 exhibits two side pieces 6, 7 which form a fork-shaped receiver space 8 which has an opening 9 at the rear. The drive assembly 10 is installed approximately in the middle of chassis 5.

The lifting device in the execution example represented in FIGS. 1–5 consists of a horizontal turning axle 11 with turning bearings 12 for the swinging arms 13 with ends that are opposite each other and that have a distance between them. The swinging arms 13 that lie opposite each other are rigidly connected to a scoop 14, as this is represented in FIG. 6.

For the sake of simplicity, the entire assembly will only be described for one side of the vehicle 1, since the assembly is symmetrical along the longitudinal central axis 79 of vehicle 1 (FIG. 5).

The scoop 14 exhibits an L-shaped profile and consists of a practically vertical front wall 16 on which a support surface 15 is connected, which is near the ground, on which the nose wheel 24, 24' of an airplane will rest. The swinging arm 13 that is mounted around a turning axle 11 with a turning bearing 12 is connected to the front wall 16 of the scoop 14 via a connecting piece 17. It is thus a one-armed lever, whereby scoop 14 is installed on the free, swinging end of a one-armed lever and/or swinging arm 13.

To swing the two swinging arms 13 that lie opposite each other and the scoop 14 that is located, fixed, between them, fluid cylinders 37 are provided, which attach on the underside of each swinging arm, and namely each on the underside of the chassis 5 on a cross beam 39 on one side and on the bottom of the respective swinging arm 13 according to FIGS. 1–4 on the other side and, as a whole, creating a lifting device. FIGS. 1 and 3 show the raised position of the lifting device. Operation of the fluid cylinders 37 results in a lowering of the entire lifting device in the direction of arrow 38, whereby the lifting device goes into the position according to FIG. 4 so that scoop 14 rests with its ground-side support surface 15 on the ground.

It must be emphasized that another execution example is also possible that is not shown in the drawing, of a type that the swinging arm 13 with its turning axle 11 according to FIG. 6 is omitted and instead of that, the scoop 14 itself is mounted on the chassis so that it can be swung around the connection point 17 in the area of a horizontal turning axle (similar to turning axle 11). The lifting drive of fluid cylinders 37 shown in FIGS. 1–4 would then be installed directly below the scoop on its free, swinging end.

An additional execution example mentioned in the introductory description relates to the fact that the scoop can not be swung but is raised and lowered in a basically vertical plane.

This means that both the swinging arm 13 with its horizontal turning axle 11 is omitted as well as the pivot mounting of scoop 14 directly to chassis 5 that was likewise described. In this case, scoop 14 would be constructed as a lifting carrier that is installed on chassis 5 and can be raised and lowered in a corresponding longitudinal guide that is basically installed in a vertical plane. Instead of this type of lifter, a parallelogram structure is also possible which is installed with one end on the scoop and another end on the chassis so that by operation of a lifting drive, scoop 14 likewise can be lifted and lowered in a basically vertical plane.

In the following, the gripping and retracting device will now be described and then the retracting device itself in detail.

FIGS. 1 and 2 show the retracting device in retracted state, FIG. 3 shows the retracting device in extended and raised state, while FIG. 4 shows the retracting device in extended and lowered state. The retracting device consists of the basic element 19a of a telescope support 19a, 19 (FIG. 5) that is identical to the swinging arm 13 in the previous execution example.

It would also be possible to use a special basic element and to install it above or below the swinging arm. An extension element 19 is installed in the basic element 19a so that is can be pushed in like a telescope, whereby the pushing drive is accomplished through a fluid cylinder/piston unit 20, which is installed with one end on the upper side of the swinging arm 13 in a turning axle 18 and which is connected with its piston rod via a connecting piece 22 to the rear, free end of the extension element 19. Through operation of unit 20, the extension element 19 is moved out of basic element 19a in the direction of the arrow and in the opposite direction. It is planned to dimension the length of extension element 19 in such a way that a gripper arm 23 installed on the rear free end of same will not extend beyond the limit of the rear side opening 9. This dimensioning is preferred in order to prevent the extension element 19 from becoming so long that the entire retracting device would be difficult to manage mechanically.

The gripper arm 23 installed on the rear end of extension element 19 consists in the present execution example according to FIGS. 1–6 of a rocker 25 that is mounted on extension element 19 in such a way that it can turn and that supports rollers 26 that are installed at a distance from each other and are parallel to each other.

According to the present invention, it is important that the gripper arm 23 always grips above the axis of rotation 40 of the nose wheel 24 that is to be grasped and pulled in. In this way, it is assured that the contact line 41 is always inclined downward in the direction of the ground and a simultaneous clamping force will be exerted, in addition to the pulling force that is exerted in the horizontal plane on nose wheel 24.

FIG. 6 shows that the retraction device can grip a nose wheel 24 with relatively large diameter equally well as a nose wheel 24' with smaller diameter because of the rocker 25. In any case, it is assured that the contact point of gripper arms 23, which lies in the area of the longitudinal axis 42 of the turning arm 13, always lies above the axis of rotation 40 of the respective nose wheel 24, 24'.

For reasons of visibility, the unit 20 with piston rod 21 has been left out here.

In addition to the simple gripper arm attachment shown here with gripper arms 23 that lie opposite each other according to FIG. 5, it is also possible to let more than one gripper arm grip on the outer periphery of nose wheel 24; for this case, a half-round attachment would then be provided, in which several rockers 24 according to FIG. 6 with attached rollers 26 would be attached in the form of a half-round profile so that they could turn so that a nose wheel 24 with greater circumference could be grasped.

The complete gripping and retracting deride designated with reference number 28 (FIG. 1) is first extended according to FIG. 3, whereby the gripper arms 23 take the swung out position according to the upper representation in FIG. 5. The vehicle 1 is then maneuvered with its rear receiver space 8 relative to the nose wheel 24, 24' of the rescued airplane in such a way that the nose wheel 24, 24' stands in the receiver space 8. The gripper arms 23 that are in the swung out position are then swung in, in arrow direction 49 (FIG. 5 bottom and 7), so that they are located behind the nose wheel 24 as in FIG. 6 and if necessary, can also be touched immediately. The units 20 lying opposite each other are actuated, which causes the extension elements 19 to be retracted in the direction of the arrow 27 (FIG. 5) into the basic elements 19a and the nose wheel 24 can then be rolled, because of this retraction force, onto the support surface 15 of the scoop 14, which has been lowered to the ground, which again is represented in FIG. 6.

The swinging drive of gripper arms 23 for swinging them in the direction of arrow 49 and in the direction opposite to it (see FIG. 7) can be designed in different ways. FIG. 7 shows how the respective gripper arms 23 are swung using a single fluid cylinder/piston unit 44, which is mounted on extension element 19. In this case, one end of unit 44 is mounted rigidly to extension element 19, while its piston rod 45 is installed via a turning bearing 47 to a lever arm 46, the other end of which is mounted on a swivel 48, which is mounted on extension element 19. On this other end, the gripper arm 23 is connected in such a way that it can not turn. If unit 44 is now operated as in FIG. 7, then piston rod 45 extends, and turning bearing 47 makes a circular arc motion around swivel 48, whereby gripper arm 23 is swung in, in arrow direction 49, to its position 29'.

In the following, the ejecting device 30 (FIG. 1) will be described, which serves to push the nose wheel 24 resting on the support surface 15 down off the scoop 14 again.

First, it can be seen in FIG. 6 that the gripping and retracting device 28 pushes nose wheel 24 so far onto scoop 14, that it optionally lies either against the front wall 16 or on the rollers of the ejecting device 30, which lies opposite the retraction device 28 and is attached to it in alignment with the longitudinal axis 42. In the execution example shown in FIGS. 1 to 4, the ejecting device consists of a fluid cylinder/piston unit 31, which is attached at one end to basic element 19a in the area of a turning axle 29 (FIG. 5). The piston rod 32 of unit 31 engages, according to FIG. 3 with a shoe 34, that can be slid along longitudinal axis 42 in a U-shaped guide rail 33 (FIG. 4). In turn, a rocker 35 is mounted on shoe 34 is such a way that it can swing. Two rollers 36 lying opposite each other are mounted on the rocker. This forms pushing arms 43, that can either be retracted in arrow direction 27 (FIG. 5) to their position 43' (FIG. 5 bottom) or extended (FIG. 5 top).

In FIGS. 8 to 10, another execution example is represented for the swinging drive of gripper arms 23 of the gripping and retracting device. This retraction device is designated with reference number 68 because it is different in function from the retraction device 28 of the execution example according to FIGS. 1 to 7. Retraction device 68 consists of pipe-shaped supports 50 that are mounted on the chassis 5 and are mounted on one side in such a way that they can swing. In each of them, a shoe 54 is mounted in such a way that it can be pushed axially. The shoe holds a lever head 56 that can be swung in the vertical axis. The lever head 56 is mounted eccentrically in the shoe 54 with regard to the attaching point (bolt 57) of a piston rod 55. Gripper arm 23 is attached in the free swinging area of lever head 56. The advantage of this version is that only a single fluid cylinder/piston unit is required for the swinging drive of gripper arm 23 and for the longitudinal drive of the retraction device in arrow direction 27 and in the opposite direction. The piston rod 55 of the fluid cylinder/piston unit is represented in FIGS. 8 to 10. For this, a locking system is required, which is shown in FIG. 8 shortly before reaching its locking position. The support 50 here consists of a square pipe and/or C-shaped profile, in the interior of which the shoe 54 can be moved lengthwise by the piston rod 55 drive via a fluid cylinder that is not represented in more detail.

The C-shaped profile of support 50 creates, according to FIG. 9, a continuous slot 52 that runs in the lengthwise direction, through which a connecting arm 67 reaches through to gripper arm 23.

If shoe 54 is now moved, via driving the piston rod 55 in arrow direction 66, against an interior contact surface 51 of the support 50, then a locking bolt 48 that is mounted, spring-loaded, in shoe 54 and can be moved axially in arrow direction 59 comes into alignment with a pushing bolt 61 that can be moved coaxially in the support 50. The pushing bolt 61 is hydraulically, pneumatically or electro-mechanically driven. Thus, as soon as the longitudinal axis 62 of the pushing bolt 61 aligns with the longitudinal axis 63 of the locking bolt 58, the pushing bolt 61 is pushed downward by a drive that is not explained in detail, so that the locking bolt 58 is pushed down in arrow direction 59 against the force of the spring and the locking between the lever head 56 and the shoe 54 is released in this way. At the same time, pushing bolt 61 creates a locking between the support 50 and the shoe 54, so that shoe 54 is locked in support 50.

As soon as locking bolt 58 releases the swinging of lever head 56, another drive of piston rod 55 in arrow direction 66 leads to a swinging of the lever head 56 in arrow direction 69 around bearing bolt 65. The swinging continues until a stop 65 of lever head 56 occurs on the interior wall of shoe 54 (FIG. 10). The swinging of lever head 56 is thus determined by the fact that piston rod 55 with its bolt 57 grips lever head 56 eccentrically with reference to bearing bolt 64.

FIG. 11 shows another execution example of the towing vehicle according to the invention, which has a scoop 14 that can be raised and lowered as well as tilted. In this, the scoop can be swung via upper control arms 73, 74 and lower control arms 70, 71 and is mounted on the chassis 5 so that it can tilt, whereby the upper control arms 73, 74 and the lower control arms 70, 71 create a parallelogram structure, on the four freely swinging points (e.g. points 80 in FIGS. 12, 14 and 15) of which the scoop 14 is attached. One or more fluid cylinder/piston units 77 are provided for raising and lowering scoop 14. It can be seen from the representation in FIGS. 12 and 13 that the lines of application 75, 76 of the upper control arms 73, 74 intersect in a pivot point 68, which lies in the vehicle longitudinal axis 79. This insures that the upper, free end of scoop 14 can not be pushed sideways out of the vehicle longitudinal axis 79.

The lines of application of the lower control arms 70, 71 are hereby attached almost parallel or in any case at a sharp angle to the vehicle longitudinal axis 79, which insures that the support surface 15 that forms the base of scoop 14, can execute the tilt to the horizontal plane required in the preceding execution example, i.e. around an axis that is basically parallel to the longitudinal axis.

FIG. 14 shows the same construction as FIGS. 11 to 13, in which the gripping and retracting device 28 and the ejecting device 30 are retracted.

FIG. 15 shows the same construction as FIG. 14, whereby, as in all the drawings, the same parts are given the same reference numbers. Scoop 14 is lowered to the ground and the retraction device 28 as well as the ejecting device 30 are extended. In this, the towing vehicle with its scoop 14 lowered to the ground has been driven close to nose wheel 24.

FIGS. 16 and 17 show the front view of scoop 14, whereby it can be seen that two fluid cylinders 77 are present here, whose the lines of application 83, 84 (FIG. 17) intersect in the area of the longitudinal central plane 82. This assures that scoop 14 with its support surface 15 can adapt to any desired tilt of the airplane chassis 81 (FIG. 18, 19). Instead of using two fluid cylinders 77, a single fluid cylinder 77 is also possible, in this case it would then be required that the line of application of this fluid cylinder 77 would lie in the longitudinal central plane 82.

FIG. 17 shows a tilt axis 72 that is represented again in FIG. 19.

According to FIG. 18, the nose chassis 81 has a strut 85 that is indicated with dotted lines, the longitudinal axis of which forms an angle 86 to the vertical to assure the required caster of nose wheel 81.

Based on this angle 86 specified by design, there is a tilt of the airplane chassis 81 when driving around curves, whereby, because of the rigid connection of the airplane axle with the nose wheel, which is constructed here doubled, the strut 85 comes to a tilt angle 87, that is compensated with the same type of tilt of scoop 14 with its support surface 15 corresponding to tilt axis 72 (FIG. 19).

In this way, extremely protected transport of the towed vehicle is attained. This avoids riggings in the area of gripper, retraction and ejecting devices 28, 30 in connection to the nose wheels 24.

It must be mentioned that, according to the invention, the structure linking the scoop 14 to the chassis 5 consisting of lower control arms 70, 71 and upper control arms 73, 74 can exhibit not only the form of a parallelogram, but also that of a trapezoid with different side lengths (which still exhibits two parallel sides of the rectangle described in the side view of the trapezoid), of such a type that different courses of scoop motion can result when it is raised and lowered according to the laws of kinematics as a consequence of the different distances of the respective attachment points. For example, the upper control arms can be constructed longer than the lower control arms in such a way that scoop 14 can not be driven parallel to itself, but executes a tipping motion of a type such that, for example, in lowered position, scoop 14 can be tipped towards the front and rest with its front edge on the ground so that the bearing surface for the nose wheel runs towards the ground and is tipped towards the nose wheel. However, after retraction of nose wheel 24, as soon as same rests on scoop 14, a swing backward of same occurs, during lifting of the scoop, so that the forward edge of the scoop, originally lying on the ground, finally, in raised position lies higher, as compared to an imaginary horizontal plane, than the end of the scoop turned towards the vehicle, so that the force of gravity alone practically causes locking of nose wheel 24 on scoop 14. This is because of the fact that the scoop 14 support surface tilted toward the side of the vehicle lets the nose wheel run against the stop surface of scoop 14 (which is created by the part 16 of scoop 14 that projects from the angle) under the influence of gravity and come to rest there.

In addition, the upper and/or lower control arms 70, 71 and/or 73, 74 can each be constructed as fluid cylinder/piston units, which according to the invention, opens up additional possibilities with regard to displacing scoop 14 by swinging around horizontal axes, tilting around the longitudinal axes and raising and/or lowering in the vertical direction, and/or of combinations of these types of motion.

We claim:

1. A towing vehicle having no draw tongue for maneuvering airplanes having a nose wheel, comprising:
    a. a chassis (5) which has spaced sides providing a rearwardly opening receiver space (8) therebetween;
    b. a plurality of axles and wheels mounted on said chassis, the rearward axles being disposed on opposite sides of said receiver space;
    c. a single scoop (14) in the forward portion of said receiver space and having a bottom wall upon which the nose wheel (24) of an associated airplane may be supported;
    d. drive means on said chassis for raising and lowering said scoop;
    e. pivot means on said chassis for controllably pivoting said scoop relative to said chassis; and
    f. an extensible gripping and retracting device (28, 68) mounted on said chassis and having elements extensible in the rearward direction of said chassis and adjacent said sides thereof, said assembly also having wheel engagement elements adjacent the rearward end of said extensible elements for gripping the nose wheel of an associated aircraft to enable it to be moved onto the bottom wall of the scoop, said extensible elements having an amount of extension in the longitudinal direction of said chassis limited to the length of the receiver space (8), said scoop being dimensioned, configured and pivotable relative to said chassis to support the associated nose wheel on said bottom wall in the area of the nose wheel load line.

2. The towing vehicle according to claim 1 wherein said scoop (14) is pivotably supported on a horizontal axle (11), mounted on said chassis (5) independently of the wheel axles and including control means for pivoting said scoop about said axle to a selected position.

3. The towing vehicle according to claim 2, wherein said control means includes at least one fluid cylinder and piston unit (37) for the controlled adjustment of the pivoted position of said scoop (14).

4. The towing vehicle according to claim 3, including a pivotable arm (13, 53) attached at one end to said horizontal axle so that it can pivot and its other end can be swung vertically, said scoop (14) being rigidly attached thereto whereby said scoop (14) can be raised, lowered and swung.

5. The towing vehicle according to claim 1, wherein said scoop is attached to said chassis (5) by a sliding carrier so that it can be raised and lowered thereon.

6. The towing vehicle according to claim 5, wherein said scoop (14) is attached to said chassis (5) by mounting means providing a parallelogram structure to raise and lower it.

7. The towing vehicle according to any of the preceding claims, wherein there is included an ejecting device (30) to push the associated nose wheel (24) off the scoop (14) at the end of the maneuvering procedure, said gripping and retracting device (28, 68) and ejecting device being connected rigidly to a common axle on said chassis.

8. The towing vehicle according to claim 1 wherein said gripping and retracting device (28, 68) has pivotable gripper arms (23) on the free end of two supports which are adapted to hold the associated nose wheel between them, the point of engagement of the gripper arms (23) with the associated nose wheel lying above the axis of rotation (40) of the nose wheel (24) and on the periphery thereof.

9. The towing vehicle according to claim 8 wherein there are included two telescoping supports, said pivotable arms (13, 53) being provided by two basic elements (19a) of the telescoping supports (19a, 19), the ends adjacent the vehicle being pivotable around the horizontal axle.

10. The towing vehicle according to claim 8, wherein each pivotable arm (13, 53) consists of two supports which are pipe-shaped, wherein the one end of said supports adjacent the vehicle are pivotable around the horizontal axle (11); wherein each of said two supports has guide slots (52) therein extending towards the associated nose wheel (24) in the lengthwise direction; wherein each of said supports (5) includes a show (54) which can be pushed axially, and which has a lever head (56) that pivots eccentrically about a vertical axle (64) across the line of motion of a fluid cylinder and piston unit (piston 55), and wherein the respective gripper arm 23 is attached to the pivoting end of said lever head (6).

11. The towing vehicle according to claim 10, wherein the position of said lever head (56) in said shoe (54) can be locked, and wherein, in the extended position of said shoe (54) in the pipe-shaped support (50), the locking between said shoe and said lever head being disengaged by a pushing bolt (61) which is moved in the axle direction of said lever head and crosswise to said shoe and simultaneously said shoe is locked in said support.

12. The towing vehicle according to any one of claims 1-6 or 8-11, wherein there is included an ejecting device (30) which consists of a fluid cylinder and piston unit (31) which is attached at one end to a pivotable arm (13, 53) and the end of the piston 32 has a slider (34) that can be moved axially on a guide rail that is mounted on said swinging arm parallel to its axis and to which is attached a discharge arm (43).

13. The towing vehicle according to claim 3, wherein said fluid cylinder and piston unit (37) forms the lifting device for said scoop (14), said cylinder and piston unit abutting said chassis (5) at one end and at the other end abuts said swinging arm (13, 53) in the area of the scoop (14) or the support (50).

14. The towing vehicle according to claim 1, wherein said scoop (14) is also continuously adjustable around an imaginary longitudinal axis to a position at an angle to a horizontal axle (11) (Angle 72, FIG. 17).

15. The towing vehicle according to claim 14, wherein said scoop (14) is attached to said chassis so that it can be raised, lowered and optionally tilted to an anglular position using lower (70, 71) and upper control arms (73, 74) and can be operated using a fluid cylinder (77), said upper and lower control arms (70, 71, 73, 74) providing a structure which is connected to said chassis on one end and to said scoop (14) on the other end.

16. The towing vehicle according to claim 15, wherein imaginary lines (75, 76) extending along the axes of said upper control arms (73, 74) intersect at a point on the imaginary longitudinal axis of the vehicle at a point that forms a pivot point (78) for said scoop (14).

17. The towing vehicle according to claim 16, wherein said lower control arms (70, 71) are disposed so that their longitudinal axes are nearly parallel to the longitudinal axis of said vehicle (79) and each of them has one end abutting a side wall of said scoop (14).

18. The towing vehicle according to claim 15, characterized by the fact that said scoop (14) automatically adjusts to the inclination of the associated nose wheel (81).

19. The towing vehicle according to any one of claims 14, 15 or 18 wherein a single fluid cylinder (77) is provided for raising and lowering said scoop (14, and wherein said fluid cylinder (77) has its axis lying in the vertical longitudinal center plane (82, FIG. 17) of said scoop (14), and the longitudinal axis of the vehicle (79).

20. The towing vehicle according to claim 14, wherein two fluid cylinders (77) are provided for raising and lowering the scoop (14), said fluid cylinders (77) being mounted with their axes in mirror symmetry to the vertical longitudinal center plane (82) of said scoop 14 and the longitudinal axis of the vehicle (79).

21. The towing vehicle according to claim 20, wherein, for automatic adjustment of the angular position of said scoop (14), said two fluid cylinders are connected so as to communicate with each other with regard to fluid.

22. The towing vehicle according to claim 21, wherein means is provided whereby communicative connection between said two fluid cylinders (77) can be blocked.

23. The towing vehicle according to one of claims 1-6, 8-11, 13-18 or 20-22, wherein there is included an ejecting device (30) and wherein said extensible and retractable gripping and retracting device (28, 68) along with said ejecting device (30) provide a generally H-shape configuration in the top view.

24. The towing vehicle according to claim 15, wherein said control arms create a parallelogram structure.

25. The towing vehicle according to claim 15, wherein said control arms create a trapezoidal structure.

26. The towing vehicle according to claim 15, wherein, in the side view, said control arms form a tetragon with different side lengths.

27. The towing vehicle according to one of claims 15, 24, 25 and 26, wherein said lower control arms (70, 71) are fluid cylinder and piston units.

28. A tow vehicle having no draw tongue for maneuvering airplanes having a nose wheel comprising:
 (a) a chassis with spaced side members defining a rearwardly opening receiver space therebetween;
 (b) a plurality of axles and wheels mounted on said chassis, the rearward axles being disposed on opposite sides of said receiver space;
 (c) a single scoop in the forward portion of said receiver space and having a bottom wall upon which the nose wheel of an associated airplane may be supported;
 (d) drive means on said chassis for raising, lowering and pivoting said scoop; and
 (e) an extensible gripping and retracting device coupled to said scoop and having elements extensible in the rearward direction of said chassis and adjacent said sides thereof, said device also having wheel engagement elements adjacent the rearward end of said extensible elements for gripping the nose wheel of an associated aircraft to enable it to be moved onto the bottom wall of said scoop, said scoop being dimensioned, configured and pivotable relative to said chassis to support the associated nose wheel on said bottom wall in the area of the nose wheel load line, and said scoop being continuously adjustable about an axis extending longitudinally thereof so that its bottom wall may be disposed on an incline with respect to the horizontal.

29. A tow vehicle having no draw tongue for maneuvering airplanes having a nose wheel comprising:
 (a) a chassis with spaced side members defining a rearwardly opening receiver space therebetween;
 (b) a plurality of axles and wheels mounted on said chassis, the rearward axles being disposed on opposite sides of said receiver space;
 (c) a single scoop in the forward portion of said receiver space and having a bottom wall upon which the nose wheel of an associated airplane may be supported;
 (d) drive means on said chassis for raising, lowering and pivoting said scoop; and
 (e) an extensible gripping and retracting device mounted on said scoop and having elements extensible in the rearward direction of said chassis and adjacent said sides thereof, said device also having wheel engagement elements adjacent the rearward end of said extensible elements for gripping the nose wheel of an associated aircraft to enable it to be moved onto and held on the bottom wall of said scoop, said gripping and retracting device being fixedly attached to said scoop, said scoop being dimensioned, configured and pivotable relative to said chassis to support the associated nose wheel on said bottom wall in the area of the nose wheel load line.

30. The towing vehicle according to claim 28 wherein said scoop (14) is attached to said chassis so that it can be raised, lowered and optionally tilted to an angular position using lower (70, 71) and upper control arms (73, 74) and can be operated using a fluid cylinder (77), said upper and lower control arms (70, 71, 73, 74) providing a structure which is connected to said chassis on one end and to said scoop (14) on the other end.

31. The towing vehicle according to claim 30, wherein imaginary lines (75, 76) extending along the axes of said upper control arms (73, 74) intersect at a point on the imaginary longitudinal axis of the vehicle at a point that forms a pivot point (78) for said scoop (14).

32. The towing vehicle according to claim 31, wherein said lower control arms (70, 71) are disposed so that their longitudinal axes are nearly parallel to the longitudinal axis of said vehicle (79) and each of them has one end abutting a side wall of said scoop (14).

33. The towing vehicle according to one of claims 30 to 32, characterized by the fact that said scoop (14) automatically adjusts to the inclination of the associated nose wheel (81).

34. The towing vehicle according to claim 28, wherein two fluid cylinders (77) are provided for raising and lowering the scoop (14), said fluid cylinders (77) being mounted with their axes in mirror symmetry to the vertical longitudinal center plane (82) of said scoop 14 and the longitudinal axis of the vehicle (79).

35. The towing vehicle according to claim 34, wherein, for automatic adjustment of the angular position of said scoop (14), said two fluid cylinders are connected so as to communicate with each other with regard to fluid.

36. The towing vehicle according to claim 35, wherein means is provided whereby communicative connection between said two fluid cylinders (77) can be blocked.

37. The towing vehicle according to one of claims 28–32 and 34–36 wherein there is included an ejecting device (30) and wherein said extensible gripping and retracting device (28, 68) along with said ejecting device (30) provide a generally H-shape configuration in the top view.

38. The towing vehicle according to claim 30, wherein said control arms create a parallelogram structure.

39. The towing vehicle according to claim 30, wherein said control arms create a trapezoidal structure.

40. The towing vehicle according to claim 30, wherein, in the side view, said control arms form a tetragon with different side lengths.

41. The towing vehicle according to one of claims 30, 38, 39 and 40, wherein said lower control arms (70, 71) are fluid cylinder and piston units.

42. The towing vehicle according to claim 29, wherein said scoop (14) is also continuously adjustable around an imaginary longitudinal axis to a position at an angle to the horizontal axis (11) (Angle 72, FIG. 17).

43. The towing vehicle according to claim 42 wherein said scoop (14) is attached to said chassis so that it can be raised, lowered and optionally tilted to an angular position using lower (70, 71) and upper control arms (73, 74) and can be operated using a fluid cylinder (77), said upper and lower control arms (70, 71, 73, 74) providing a structure which is connected to said chassis on one end and to said scoop (14) on the other end.

44. The towing vehicle according to claim 43 wherein imaginary lines (75, 76) extending along the axes of said upper control arms (73, 74) intersect at a point on the imaginary longitudinal axis of the vehicle at a point that forms a pivot point (78) for said scoop (14).

45. The towing vehicle according to claim 44 wherein said lower control arms (70, 71) are disposed so that their longitudinal axes are nearly parallel to the longitudinal axis of said vehicle (79) and each of them has one end abutting a side wall of said scoop (14).

46. The towing vehicle according to one of claims 43 to 45 characterized by the fact that said scoop (14) automatically adjusts to the inclination of the associated nose wheel (81).

47. The towing vehicle according to claim 42 wherein two fluid cylinders (77) are provided for raising and lowering the scoop (14), said fluid cylinders (77) being mounted with their axes in mirror symmetry to the vertical longitudinal center plane (82) of said scoop 14 and the longitudinal axis of the vehicle (79).

48. The towing vehicle according to claim 47, wherein, for automatic adjustment of the angular position of said scoop (14), said two fluid cylinders are connected so as to communicate with each other with regard to fluid.

49. The towing vehicle according to claim 48, wherein means is provided whereby communicative connection between said two fluid cylinders (77) can be blocked.

50. The towing vehicle according to claim 29, wherein there is included an ejecting device (30) and wherein said extensible gripping and retracting device (28, 68) along with said ejecting device (30) provide a generally H-shape configuration in the top view.

51. The towing vehicle according to claim 43, wherein said control arms create a parallelogram structure.

52. The towing vehicle according to claim 43, wherein said control arms create a trapezoidal structure.

53. The towing vehicle according to claim 43, wherein, in the side view, said control arms form a tetragon with different side lengths.

54. The towing vehicle according to one of claims 43, 51, 52 and 53, wherein said lower control arms (70, 71) are fluid cylinder and piston units.

* * * * *